United States Patent
Gucciardino et al.

(10) Patent No.: US 9,829,407 B2
(45) Date of Patent: Nov. 28, 2017

(54) MEASURING UNIT AND MEASURING ASSEMBLY FOR MEASURING UNBALANCE FORCES

(71) Applicant: Snap-on Equipment Srl a unico socio, Correggio (RE) (IT)

(72) Inventors: Lillo Gucciardino, Bomporto (IT); Emilio Ribecco, Carpi (IT); Paolo Sotgiu, Modena (IT)

(73) Assignee: SNAP-ON EQUIPMENT SRL A UNICO SOCIO, Correggio (RE) (IT)

( * ) Notice: Subject to any disclaimer, the term of this patent is extended or adjusted under 35 U.S.C. 154(b) by 191 days.

(21) Appl. No.: 14/809,164

(22) Filed: Jul. 24, 2015

(65) Prior Publication Data

US 2017/0023431 A1 Jan. 26, 2017

(51) Int. Cl.
*G01M 1/04* (2006.01)
*G01M 1/16* (2006.01)
*G01M 1/22* (2006.01)

(52) U.S. Cl.
CPC ............... *G01M 1/16* (2013.01); *G01M 1/04* (2013.01); *G01M 1/225* (2013.01)

(58) Field of Classification Search
CPC ................................. G01M 1/04; G01M 1/045
See application file for complete search history.

(56) References Cited

U.S. PATENT DOCUMENTS

| | | |
|---|---|---|
| 6,779,400 B1 | 8/2004 | Thelen et al. |
| 7,644,616 B1 * | 1/2010 | Cullum .................. G01M 1/02 73/462 |
| 2007/0174022 A1 | 7/2007 | Wiles et al. |
| 2010/0000319 A1 | 1/2010 | Sotgiu et al. |
| 2012/0240677 A1 * | 9/2012 | Sotgiu ..................... G01M 1/04 73/462 |
| 2014/0251008 A1 | 9/2014 | Buzzi |

FOREIGN PATENT DOCUMENTS

| | | |
|---|---|---|
| EP | 2141474 A1 | 1/2010 |
| EP | 2503313 A1 | 9/2012 |
| EP | 2775281 A1 | 9/2014 |

OTHER PUBLICATIONS

The Extended European Search Report dated Jan. 28, 2016 issued in European Patent Application 15178312.3.

* cited by examiner

*Primary Examiner* — John Chapman, Jr.
(74) *Attorney, Agent, or Firm* — McDermott Will & Emery LLP

(57) ABSTRACT

The present invention relates to measuring unit for measuring forces generated by unbalance of rotor mounted on measuring shaft, particularly of vehicle wheel mounted on measuring shaft of wheel balancing machine, the measuring unit comprising stationary frame, first bearing for receiving measuring shaft rotatably about its shaft axis (Z), second bearing pivotally supporting first bearing about pivot axis (Y) which intersects shaft axis (Z) and being supported on stationary frame, first force sensor for measuring forces generated by unbalance of rotating rotor and acting on measuring shaft about pivot axis (Y), and second force sensor for measuring forces generated by unbalance of rotating rotor and acting on measuring shaft and on second bearing in direction intersecting shaft axis (Z), wherein second bearing and stationary frame are integrally formed of single element as support plate.

14 Claims, 7 Drawing Sheets

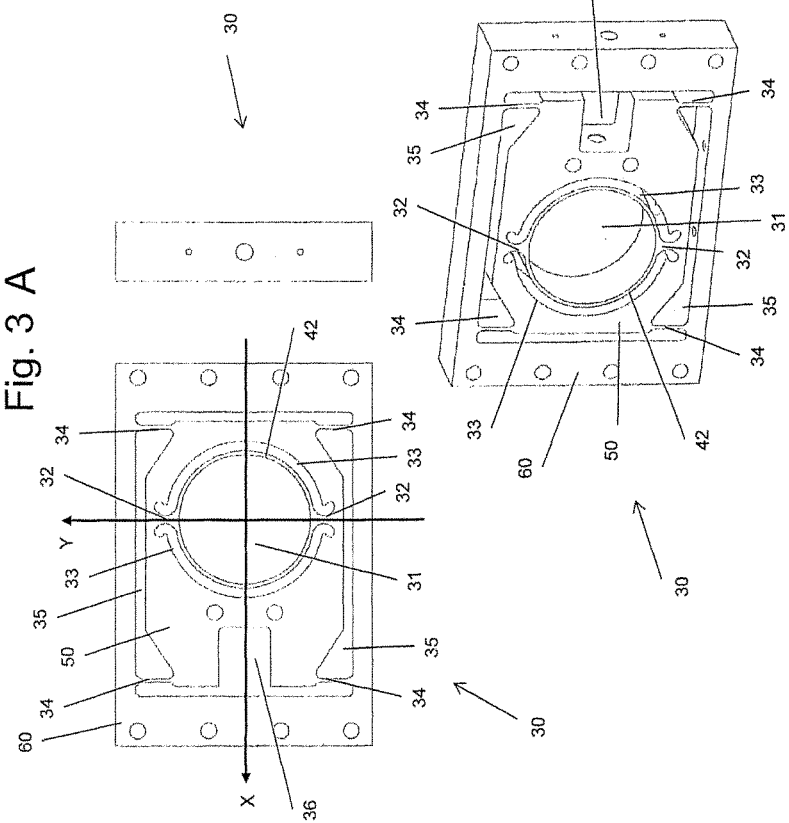

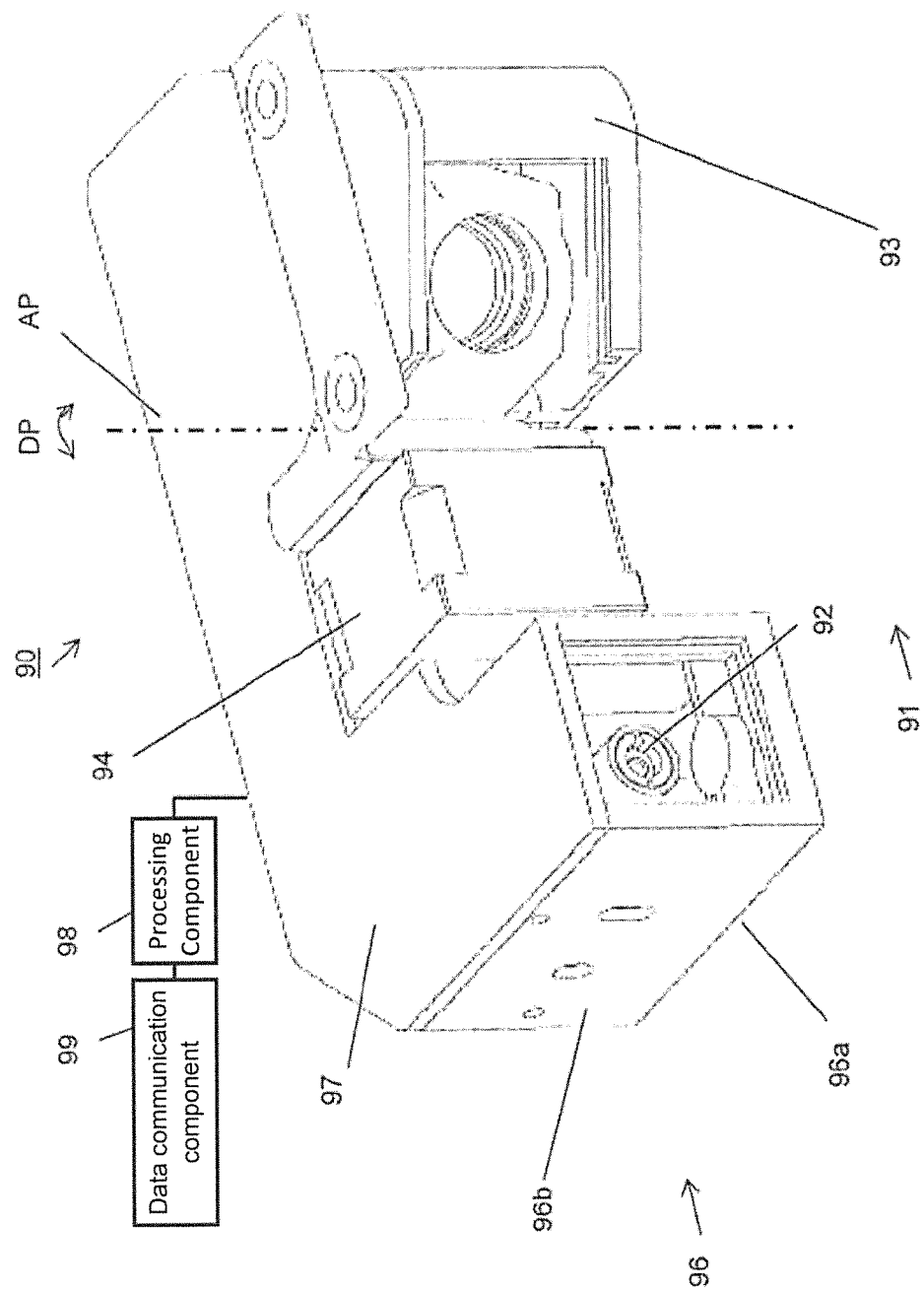

MEASURING UNIT AND MEASURING ASSEMBLY FOR MEASURING UNBALANCE FORCES

Figure 1:
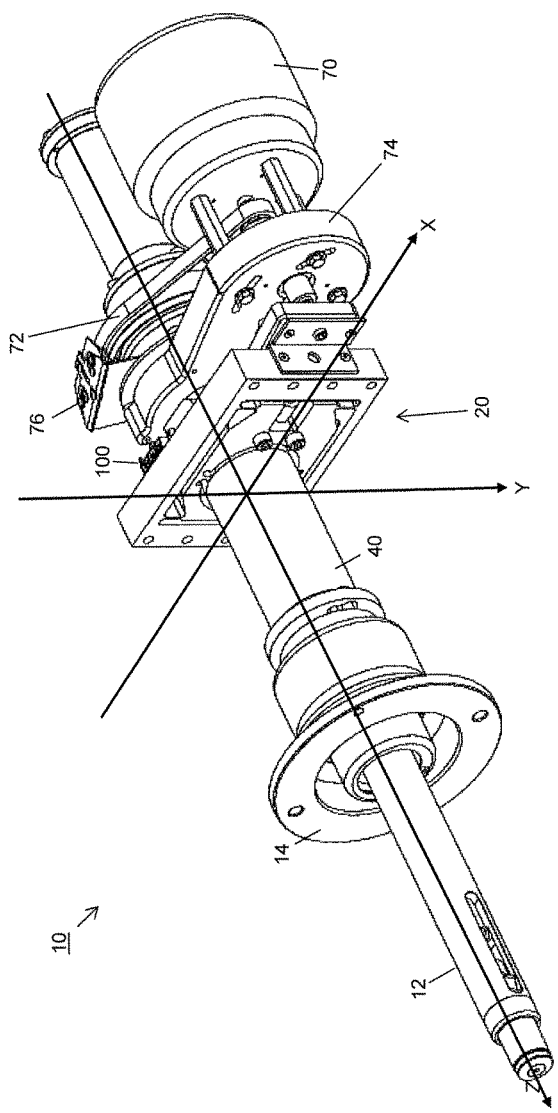
Figures 2A, 2B, 2C:
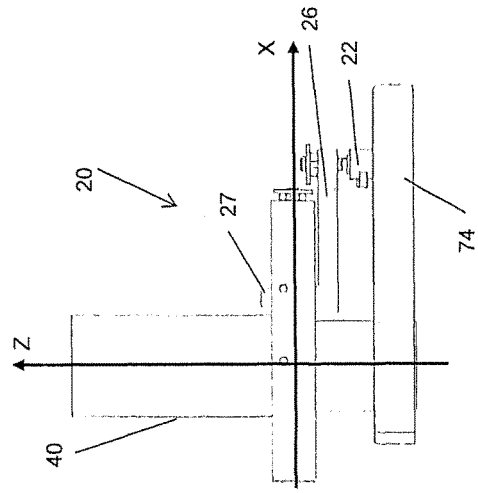
Figures 2D, 2E:
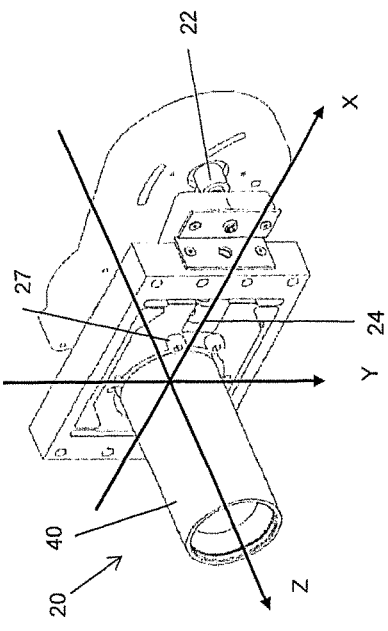

This application is related to a corresponding European Patent Application filed on the same date as this application, Jul. 24, 2015 in the European Patent Office as European Patent Application No. EP 15178312.3 (now published as European Patent Publication No. EP 3 121 577 A1), which is incorporated by reference in its entirety.

The invention relates to a measuring unit for measuring forces generated by an unbalance of a rotor mounted on a measuring shaft. The invention further relates to a measuring assembly comprising the measuring unit and to a wheel balancing machine.

More precisely, the invention relates to a measuring unit for measuring forces generated by an unbalance of a rotor mounted on a measuring shaft, particularly of a vehicle wheel mounted on a measuring shaft of a wheel balancing machine, the measuring unit comprising a stationary frame, a first bearing for receiving the measuring shaft rotatably about its shaft axis, a second bearing pivotally supporting the first bearing about a pivot axis which intersects the shaft axis and being supported on the stationary frame, a first force sensor for measuring forces generated by an unbalance of the rotating rotor and acting on the measuring shaft about the pivot axis, and a second force sensor for measuring forces generated by the unbalance of the rotating rotor and acting on the measuring shaft and on the second bearing in a direction intersecting the shaft axis.

European patent application 2 503 313 discloses a device for measuring forces generated by an unbalance of a rotating rotor of the type described above. In this known device, the second bearing has a rigid frame structure in the form of a rectangular cuboid or box and supports the first bearing pivotable about a pivot axis. The pivot axis is generated by spring means consisting of two torsion springs, which are formed on mounting bolts rigidly connected to the first bearing and the second bearing. The mounting bolts extend diametrically from the surface of the tubular first bearing. The second bearing is supported on the stationary frame structure by means of plate springs based on both sides of the shaft and extend parallel to each other perpendicularly with respect to the shaft axis. The plate springs have equal distances from the shaft axis on opposing surfaces of the frame structure. Both ends of the plate springs are rigidly connected by means of screws or the like to the box-shaped frame structure of the second bearing and to respective parts of the stationary frame of the wheel balancing machine.

The measuring device according to the state of the art suffers from several deficiencies. It is commonly known that the axial distance between the rotating rotor, corresponding to the vehicle wheel in this case, the planes of the measuring sensors and the position of the drive means is a source of error for unbalance force measurements, wherein less distance between these elements, respectively a smaller overall axial extension of the measuring device, provides better measurements. According to the state of the art, the second bearing consists of a box-shaped rigid frame structure with severe axial extension. The axial extension of the second bearing according to the device of the prior art is thus unfavourable in terms of accuracy of measurements.

In addition, the box-shape and the thus resulting axial extension of the rigid frame structure is crucial to the device according to the state of the art, as the mounting bolts for mounting the first bearing within the second bearing pivotably about a pivot axis need a supporting structure. This supporting structure, however, is the frame surface on the upper and lower surface of the box-shaped rigid frame structure, respectively. The axial extension must thus be larger than at least the mounting bolt, in order for the mounting bolt to be securely attached, for instance screwed, to the rigid frame structure of the second bearing. In other words, it is not possible to reduce the axial extension of the frame structure of the second bearing in the device known from the art, as the extension is needed for the support of the mounting bolts forming the first spring means.

Moreover, also the plate springs between the second bearing and the machine frame structure of the wheel balancing machines are provided and screwed/fixed in the prior art device in a manner that makes an axial extension of the frame structure mandatory.

Furthermore, as the frame structure of the second bearing is movably supported on the machine frame structure and force measurements are carried out between the second bearing and the machine frame structure, measurements are carried out between the measuring device and a distinct entity, namely the machine frame. Accordingly, measurements might not be reproducible, depending on the machine frame structure used, and can deviate among different machine frame structure. This deviation of measurements and/or possibly reduced measurement accuracy can lead to less favourable measurements and thus balancing results.

In light of these deficiencies known from the art it has thus been an object of the present invention to provide a measuring unit for measuring forces generated by an unbalance of a rotor that provides improved measurement results and reduced manufacturing costs.

The problem identified above is solved by a measuring unit for measuring forces generated by an unbalance of a rotor mounted on a measuring shaft, particularly of a vehicle wheel mounted on a measuring shaft of a wheel balancing machine, the measuring unit comprising a stationary frame, a first bearing for receiving the measuring shaft rotatably about its shaft axis, a second bearing pivotally supporting the first bearing about a pivot axis which intersects the shaft axis and being supported on the stationary frame, a first force sensor for measuring forces generated by an unbalance of the rotating rotor and acting on the measuring shaft about the pivot axis, and a second force sensor for measuring forces generated by the unbalance of the rotating rotor and acting on the measuring shaft and on the second bearing in a direction intersecting the shaft axis, wherein the second bearing and the stationary frame are integrally formed of a single element as a support plate.

By providing a support plate formed of a single element comprising the second bearing and the stationary frame, the overall axial extension of the second bearing can be reduced to the axial extension of the support plate only. Particularly, the support plate allows a compact, single piece arrangement. The need for providing a complex frame structure including attachment means for attaching the second bearing to the stationary frame is avoided. Further, as the number of parts assembled together to form the measuring unit is reduced compared to the prior art, the manufacturing costs and effort are reduced. Further, also more free space for additional entities of the tyre service machine, such as the wheel balancing machine, can be positioned more flexibly, as the space occupied by the measuring unit compared to the overall dimensions is reduced. Finally, also the overall axial extension of the measuring unit and measuring shaft assembly, such as the wheel balancing machine, can be reduced. Thereby, measuring accuracy can be increased.

In a further development of the measuring unit according to the present invention, the pivot axis is perpendicular to the shaft axis. Since the pivot axis is perpendicular to the shaft axis, the rotation of the shaft about the shaft axis becomes orthogonal and thus independent from the pivoting about the pivot axis.

In one development of the measuring unit according to the present invention, a detection axis of the second force sensor is arranged substantially perpendicular to both the pivot axis and the shaft axis.

By this arrangement, the forces measured by the second force sensor are not overlaid with forces resulting from movements along the shaft axis or rotations about the pivot axis. Since the axes are substantially perpendicular to each other, force and movement components in each of the respective other axes are zero.

In this context, substantially perpendicular means an angle of between 80° and 100°, more preferably between 85° and 95° and most preferably between 89° and 91°.

In a further development, the detection axis of the second force sensor is arranged substantially perpendicular to both the pivot axis and the shaft axis in a resting position of the measuring shaft. With a resting position, it is referred to the position in which no force is applied to the pivot axis by the first spring. In this position, a transverse axis is perpendicular to both the pivot axis and the shaft axis. Since the second force sensor is preferably aligned with the transverse axis, also the second force sensor is arranged perpendicular to both of the pivot axis and the shaft axis.

In one development of the measuring unit according to the present invention, a detection axis of the first force sensor is arranged substantially parallel to the shaft axis.

In this context, substantially parallel means an angle between two axes of between 0° and 10°, more preferably between 0° and 5° and most preferably between 0° and 1°.

For measuring a rotation about the pivot axis, a detection axis of the first force sensor has to be inclined with respect to the pivot axis. In order to obtain the most accurate pivot force measurement, it is preferred for the detection axis of the first force sensor to be arranged perpendicular to the pivot axis. In this development, the first force sensor is arranged substantially parallel to the shaft axis in order for the mounting arrangement to be more compact. However, in other developments, also different arrangements of the detection axis of the first force sensor, such as perpendicular to the shaft axis or the like, are contemplated, as long as the detection axis of the first force sensor is not arranged along the pivot axis.

In a further development, the measuring unit according to the present invention comprises at least one first spring for pivotally supporting the first bearing within the second bearing about the pivot axis.

Providing springs allows for the system to return to the undisturbed situation, wherein an increased disturbance from the resting position creates a larger force for the system to return to the resting position due to the springs.

In one development, the at least one first spring is formed by at least one torsion spring. Since the first spring is formed by at least one torsion spring, rotational disturbance of the system, namely the first bearing being rotated with respect to the second bearing about the pivot axis, is forced so as to return to the resting position. And additionally, since rotational displacement creates counter forces in the torsion springs, the displacement can be used to be translated into an unbalance force. Thus, it can in one development not be necessary to directly measure the forces, but to measure the rotational displacement instead. In other words, instead of measuring unbalance forces, also the measurement of rotational displacements, velocities (variation in displacements) and accelerations (variations in velocities) can be considered.

In one development of the measuring unit according to the invention, the support plate comprises the at least one first spring as an integral part thereof. Since the support plate comprises the at least one first spring as an integral part thereof, there is no need of fixing the at least one first spring to the second bearing being part of the support plate. Therefore, at the same time the number of parts involved in the measuring unit can be reduced and the axial extension of the measuring unit can be reduced, since no additional fixing means, such as screws, need space for being attached to the second bearing.

In a further development, the measuring unit according to the invention comprises at least one second spring for supporting the second bearing within the stationary frame.

By providing a second spring, substantially the same advantages as by providing the first spring can be achieved, namely to return the position of the second bearing within the stationary frame to a resting position. The force with which the second spring forces the system consisting of the second bearing and the stationary frame towards the resting position increases with the deviation of the second bearing or the stationary frame, respectively, from the resting position.

In one development, the at least one second spring is formed by at least one plate spring. Thereby, linear movement along the plate spring axis is possible, whereas movement perpendicular thereto is inhibited by the plate spring. Thus, in case the plate spring is arranged such that the movement along a transverse axis is possible, a movement of the second bearing relative to the stationary frame along a pivot axis and/or the shaft axis is not possible.

In one development of the measuring unit according to the present invention the at least one second spring is configured such that the second bearing is translational moveable with respect to the stationary frame in a transverse axis perpendicular to the shaft axis and/or the pivot axis.

For instance, the translation may be possible in the transverse axis in this development. However, the definition of transverse, pivot and shaft axis is arbitrary and also a different selection of axes is possible.

In one development of the measuring unit according to the present invention, the support plate comprises the at least one second spring as an integral part thereof. Since the support plate comprises the at least one second spring as an integral part thereof, the number of parts can further be reduced. Moreover, no axial extension of the support plate is needed in order for the second spring to be attached between the second bearing and the stationary frame, wherein the second spring allows a linear movement between the second bearing and the support plate in the transverse direction. In addition to the size saving advantage, since the number of components gets reduced, manufacturing becomes easier and more cost-efficient.

In one development of the measuring unit according to the present invention, the support plate comprises a sensor reception recess for receiving a sensor perpendicular to the shaft axis and the pivot axis between the second bearing and the stationary frame.

Since between the second bearing and the stationary frame a sensor reception recess is provided, the sensor for measuring the movement or force between the second bearing and the stationary frame can be provided coaxially with the support plate and thus the overall axial direction is not increased by a sensor positioned axially outside of the support plate. Thus, the orientation of the sensor corresponds to the transverse direction and its direction intersects both the shaft axis and the pivot axis at one point within the support plate.

In one development, the measuring unit according to the invention comprises a processing component for processing the data received by the first force sensor and/or the second force sensor, and a data communication component for performing data communication with another data communication component, particularly for transferring the data processed by the processing component.

Generally, sensors of the measuring unit provide raw data, which has to be understood by whatever processing means this data is transmitted to. If these raw data are to be transferred to a central processing means, for instance of the wheel balancing machine, the wheel balancing machine has to know exactly which raw data it is supplied with by the measuring device. In case a sensor or the like of the measuring unit gets replaced or changed, there exists the possibility that the raw data sent to the central processing means differ from the raw data the central processing means is aligned to. By providing a processing component integrally with the measuring unit, the measuring unit can provide processed data of always the same data format, for instance to the central processing unit of the wheel balancing machine. More particularly, the measuring unit itself can be calibrated, such that the first and second sensor of the measuring unit are calibrated with respect to the processing component formed in the measuring unit. In this case, it must not be necessary for the measuring unit to be calibrated with respect to the machine, such as the wheel balancing machine, it is used with.

In a further development of the measuring unit according the present invention, the data communication component is arranged for wirelessly communicating with another data communication component according to a predefined protocol.

Since the data communication component is configured for transmitting the data wirelessly, it is not necessary for communication cables to be connected between the measuring unit and, for instance, the wheel balancing machine. This facilitates substantially installation, replacement and maintenance of such measuring unit employed in a machine, such as a wheel balancing machine. Further, by omitting physical cables between measuring unit and, for instance, wheel balancing machine, space occupied by cables is not needed anymore, such that the overall dimensions of the measuring unit and thus the wheel balancing machine can be reduced. Thereby, additionally a higher degree of accuracy can be achieved, since a thereby achievable smaller distance between the measuring unit and a rotor mounted on the measuring shaft can account for a higher accuracy of the measurements carried on by the measuring unit.

Further, since the data communication component communicates according to a predefined protocol, the data communication becomes independent from the particular measuring sensor used. More specifically, the addressee of the data communication component can recognize the processed data without an analysis of the data in view of sensor particularities becoming necessary. Thus, it is possible to alter, replace and/or add a measuring sensor to the measuring unit without difficulties for the other data communication component, such as a central processing unit of the exemplary wheel balancing machine, to understand the altered and/or additional data.

In one development of the measuring unit according to the present invention, the another data communication component is at least one of a central unit of a wheel balancing machine, a data communication component of a further measuring unit employed in the same or a different machine, a server component, a tablet computer or a mobile phone. However, these are only examples of data communication components with which the measuring unit can be arranged to communicate and also different components are considered by a person skilled in the art.

In one embodiment, a measuring assembly comprises a measuring unit according to the present invention and a drive support member in rigid connection with the first bearing for supporting a drive means for rotating the rotor about the shaft axis, wherein the first sensor is with one end thereof mounted to the drive support member.

Since the first sensor is on one end thereof mounted to the drive support member, it is not necessary to provide a distinct mounting means for one side of the first sensor, as the drive support member is in any case necessary in order to support a drive means for rotating the rotor about the shaft axis. In other words, a component already provided with the measuring assembly is reused and functions at the same time as a support for the first force sensor.

In a further development, the mounting assembly according to the present invention comprises a lever extending from the second bearing substantially parallel to the drive support member, wherein the second end of the first force sensor is mounted to the lever.

By mounting the first force sensor between the drive support member and the lever extending from the second bearing, the first force sensor gets fixed between the first bearing, which is rigidly connected to the drive support member, and the second bearing, to which the lever is rigidly connected. Accordingly, such mounted first force sensor can measure the pivot force between first bearing and second bearing about the pivot axis. More precisely, any displacement between lever and drive support member is proportional to the torsion angle between them about the pivot axis.

In this development, the first force sensor is mounted between the first bearing and the second bearing. However, in a different development, the first force sensor can also be mounted between the first bearing and the stationary frame. In this case, the first force sensor will measure a force of the pivot force overlaid with the transverse force acting between second bearing and stationary frame. However, since the pivot axis and thus the pivot movement is perpendicular to the transverse movement, a separation between both movements is easily possible. Further in this example, a lever is not necessarily needed, since the first force sensor can directly be mounted between the drive support member and the stationary frame.

In one embodiment, a wheel balancing machine comprises a machine frame and a measuring unit or a measuring assembly according to the present invention.

Such wheel balancing machine provides for all the advantages and benefits of the measuring unit or the measuring assembly according to the present invention as discussed above.

In a further development, the wheel balancing machine according to the present invention comprises a central processing unit arranged for communicating, preferably wirelessly communicating, with the data communication component of the measuring unit in accordance with a predefined protocol.

Since the wheel balancing machine is arranged for communicating, preferably wirelessly communicating, with a data application component of the measuring unit or the measuring assembly, measurement signals can be processed by the central processing unit of the wheel balancing machine. Moreover, since the communication is performed in accordance with a predefined protocol, the central processing unit does not depend on calibration measurements or the particular type of sensors used. In other words, it is possible to replace the measuring unit and/or add an additional measuring unit with different or additional sensors, without problems in terms of the central processing unit not being able to process the received data or the like. Moreover, such predefined protocol enables and facilitates the future requirement of wheel balancing machines to record all balancing operations performed in an extensive way.

Finally, in case the measuring unit communicates wirelessly with the central processing unit, assembling and maintenance effort can further be reduced, since no cable has to be connected between the measuring unit and the central processing unit for transmitting the data according to a predefined protocol. This is particularly advantageous since size is crucial for wheel balancing machines, as indicated above, wherein the cable occupies space and the more comfortable the connection of cables should be, the larger the space required for the cable would be. By avoiding the need for cables at all, also the requirement for such an accommodating space for said cables does not exist anymore.

Further advantages and preferred embodiments of the present invention will be described in the following together with the drawings listed below. In the following description, the expressions "left", "right", "bottom", and "top" referred to in the drawings refers to an orientation, in which the designation of the figures and the reference signs can be read.

Figure 4:
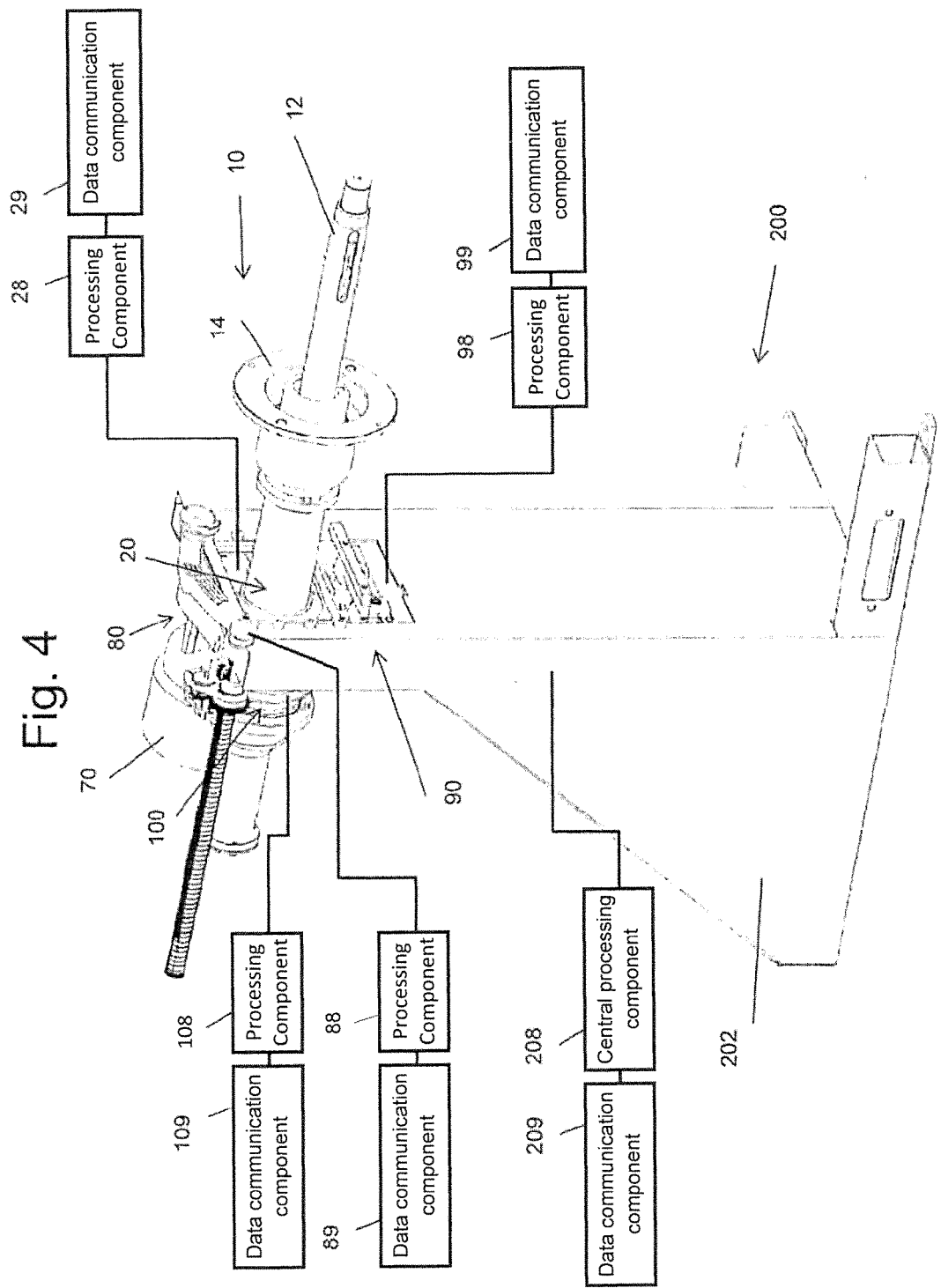
Figure 5:
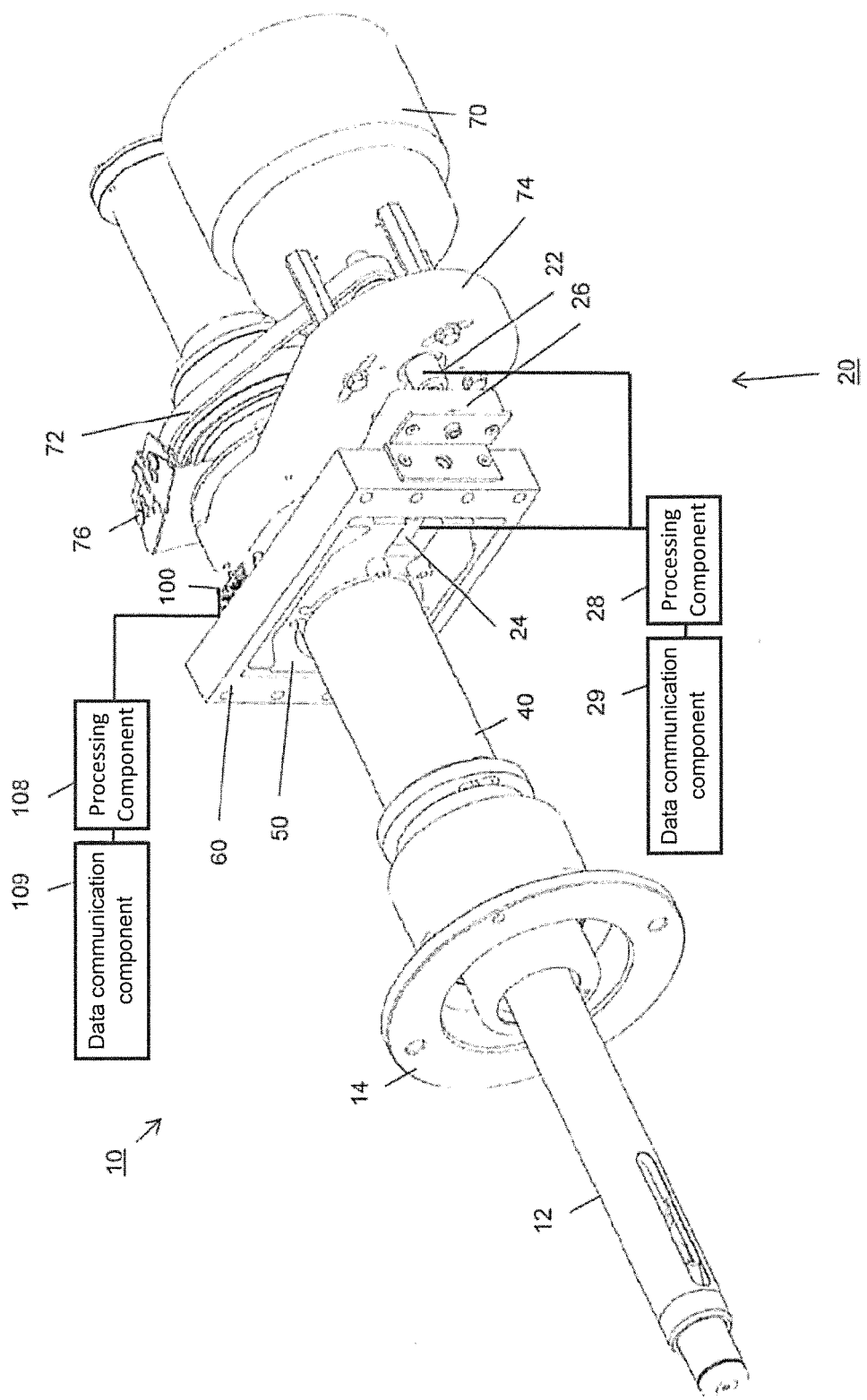
Figure 6:
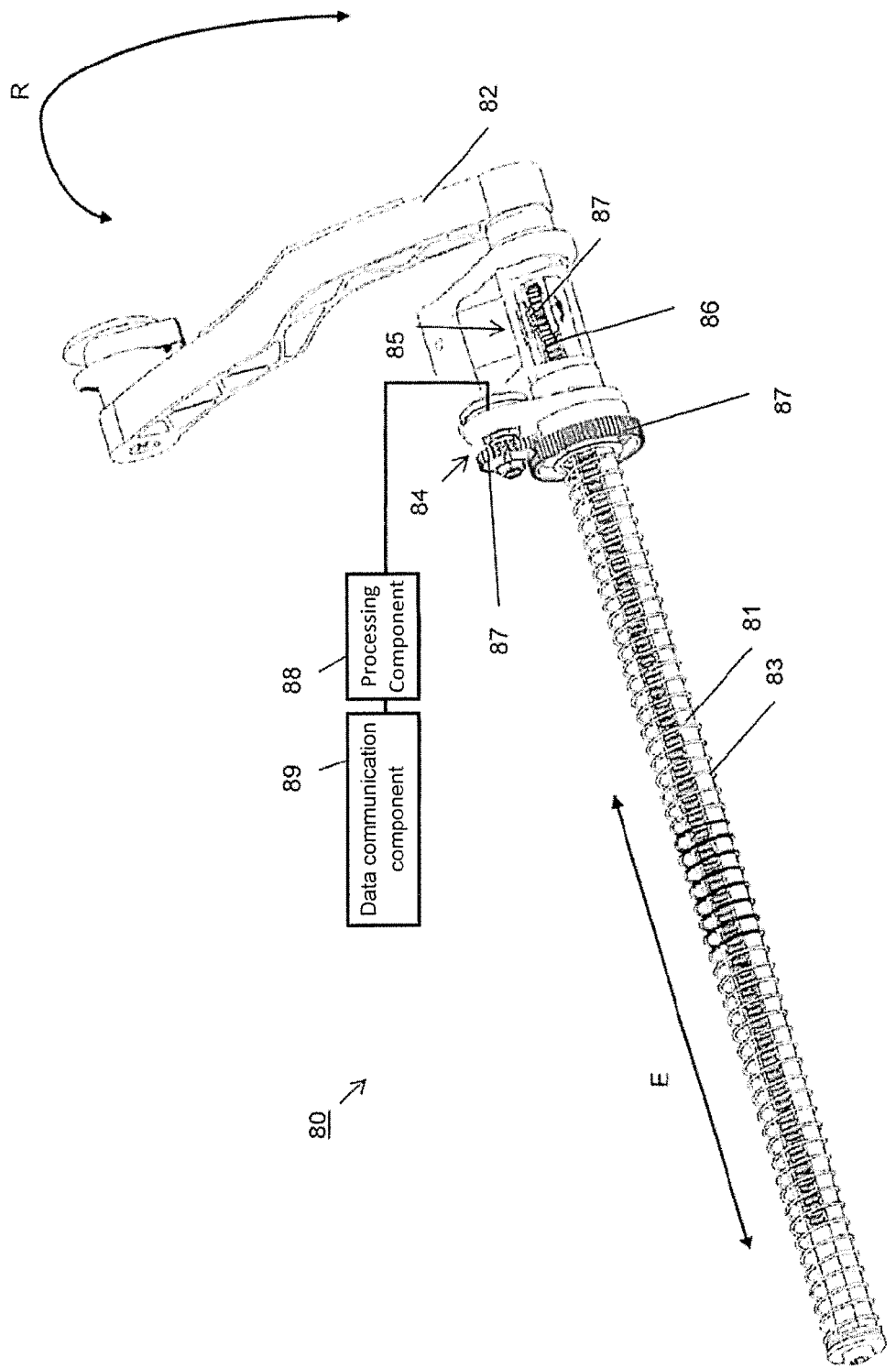

In the drawings:

FIG. 1 shows a perspective view of a measuring assembly for a tyre service machine comprising the measuring unit according to the invention, FIGS. 2A-2E show respective views of the exemplary measuring unit according to the present invention, FIGS. 3A and 3B show respective views of the exemplary support plate employed within the measuring unit according to the present invention, FIG. 4 shows a perspective view of a wheel balancing machine as an example employing the measuring assembly according to the invention, FIG. 5 shows a perspective view of an additional measuring unit according to the present invention, FIG. 6 shows a detailed perspective view of a semi automatic parameter entry unit as an example of a further measuring unit useful for understanding the present invention, and FIG. 7 shows a detailed perspective view of a laser scanner unit as an example of a further measuring unit useful for understanding the present invention.

The embodiment shown in FIG. 1 is a measuring assembly 10 for measuring forces, especially unbalance forces which are generated by an unbalance of a rotating rotor, in particular a rotating vehicle wheel (not shown). A measuring shaft 12 is rotatably mounted within a first bearing 40 to be rotated about its shaft axis Z. In this example, for instance, measuring shaft 12 is rotatably supported by means of roller bearings (not shown) within tubular first bearing 40.

A drive means 70, in particular an electric motor, is provided for rotating measuring shaft 12 within first bearing 40. The rotation of drive means 70 is transmitted to measuring shaft 12 by means of a transmission belt 72. Drive means 70 itself is supported relative to first bearing 40 by a support member 74, which is rigidly connected to both first bearing 40 and drive means 70.

Next, electronic means 76 are provided, for instance for driving a clamping system for clamping a vehicle wheel onto measuring shaft 12 by means of clamping means 14. Electronic means 76 can, however, also control additional or different electronics parts in a different example.

Measuring assembly 10 is connected to a machine frame of the tyre service machine it is designed to be used with only by means of measuring unit 20. Since drive means 70 and also no further part, despite measuring unit 20 as described, is connected to the machine frame, a self-contained measurement of unbalance forces can be achieved.

A rotational encoder unit 100 provides the rotational position of main shaft 12, such that forces measured by measuring unit 20 can be corresponded to a particular rotational position of the main shaft. In other words, the rotational position is needed in order to bring measured force values into relation with a physical position on the wheel in order to calculate balancing weight needed for balancing the wheel. Rotational encoder unit 100 is, in this example, an optical encoder, for instance with the configuration known from European patent 1 089 059.

Measuring unit 20 is now described in more detail with reference to FIGS. 2A-2E. FIGS. 2A-2E show respective views of measuring unit 20 from different angles of view.

Orthogonal with respect to the direction of shaft axis Z of measuring shaft 12, a transverse axis X and a pivot axis Y are shown. The axes X, Y and Z form an orthogonal system of axes. The origin of this orthogonal system is depicted at the point intersecting the centre of measuring shaft 12 in the direction of shaft axis Z and the central plane in a thickness direction of a support plate 30, wherein support plate 30 extends in transverse axis X and pivot axis Y. Support plate 30 essentially supports measuring shaft 12 and therefore the rotating rotor mounted thereon on a frame or casing of a tyre service machine. However, the skilled person realizes that this axis selection is arbitrary and the axes can be defined readily without difficulties.

It should be noted that although transverse axis X is shown in a horizontal and pivot axis Y is shown in a vertical orientation, the arrangement is not limited thereto and also other orientations, for instance having the entire assembly rotated about a certain degree, are contemplated by the skilled person.

A second bearing 50 supports first bearing 40 inserted therein and supports first bearing 40 about an axis corresponding to pivot axis Y.

Second bearing 50 is supported within a stationary frame 60 such that translational movements are possible in a direction of transverse axis X. Accordingly, the translational movement between second bearing 50 and stationary frame 60 is perpendicular to pivot axis Y, defined by second bearing 50 about first bearing 40. In other words, both axes of movement, namely the rotation about pivot axis Y and the translation in direction of transverse axis X, are orthogonal to shaft axis Z.

In this example, at least part of first bearing 40, second bearing 50 and stationary frame 60 are formed of a single support plate 30, which is now described in more detail with reference to FIGS. 3A and 3B. FIGS. 3A and 3B show respective side views of support plate 30 seen from different points of view. With X, Y and Z, the same axes as described with reference to FIGS. 2A-2E are referred to.

In the centre of support plate 30, there is provided a through hole 31, through which measuring shaft 12 surrounded by first bearing 40 is inserted. To this end, support plate 30 also comprises a thin ring-shaped member 42 that improves the coupling between support plate 30 and tubular first bearing 40. Radially outward from ring-shaped member 42, there is provided second bearing 50. Between second bearing 50 and ring-shaped member 42 there is a free space 33 at almost the entire circumference of ring-shaped member 42, except for two oppositely located thin portions, namely first spring elements 32. First spring elements 32 are provided to support ring-shaped member 42 and thus first bearing 40 inserted therein pivotally about second bearing 50. In this case, first spring elements 32 can also be referred to as torsion springs. A stiffness and force constant of these torsion springs 32 can be adjusted by geometrical considerations of the particular implementation. In this example, the torsion springs are aligned with the pivot axis Y such that measuring shaft 12 can pivot by virtue of the torsion springs.

Finally, further radially outward, support plate 30 comprises stationary frame 60 connecting measuring assembly 10 with a machine frame of a tyre service machine (not shown). A free space 35 between second bearing 50 and stationary frame 60 is bridged by four second spring elements 34, in this case plate springs 34, which are substantially symmetrically placed at all edges of second bearing 50 in the X-Y-plane, which is the plane having support plate 30 aligned therewith. Plate springs 34 support second bearing 50 movable along the transverse axis X with respect to fixed stationary frame 60.

In summary, first bearing 40 and thus measuring shaft 12 is allowed a pivot movement about pivot axis Y and a linear movement along transverse axis X. In this case, pivot axis Y and transverse axis X are orthogonal with respect to each other, therefore allowing a clean separation of measurements measuring the respective movements.

Radially outward from the centre of ring-shaped member 42 towards stationary frame 60 in the direction of transverse axis X, there is a sensor recess 36 formed. A sensor mounted therein can ensure that the measurement direction of such sensor be optimized with respect to the linear movement along transverse axis X and at the same time the overall extension of measuring unit 20 does not exceed the dimension of support plate 30 in the axial direction of shaft axis Z.

In one example, the entire tubular first bearing 40 can also be formed as an integral part of support plate 30. In another example, tubular first bearing 40 can be fixed to ring shaped member 42, such as by welding or a different suitable process. In a further example, support plate 30 does not provide ring shaped member 42 and first bearing 40 is directly fixed to first spring elements 32.

Now that the supporting structure involving support plate 30 has been extensively discussed, the actual force and movement measuring arrangement will be described with reference again to FIGS. 2A-2E. A first force sensor 22 measures forces generated by unbalance of the rotating rotor and acting pivotally about the pivot axis Y. A second force sensor 24 measures forces generated also by unbalance of the rotating rotor and acting upon measuring shaft 12 and second bearing 50 linearly along transverse axis X.

First force sensor 22 is positioned and tensioned between first bearing 40 and second bearing 50. A measuring or detection axis of force sensor 22 substantially corresponds to shaft axis Z and measures the force with which first bearing 40 is pivoting about pivot axis Y. Although in this example, the detection axis is substantially parallel to shaft axis Z, also other measurement axes are contemplated. However, the detection axis of first force sensor 22 must be inclined with an angle with respect to pivot axis Y. It is thus preferred that the angle between pivot axis Y and the measuring direction or detection axis of first force sensor 22 be close to 90°, such as 75° to 105°, preferably 80° to 100° and more preferably 85° to 95°.

On one end thereof, first force sensor 22 is attached to drive support member 74. Thereby, no additional supporting structure for supporting first force sensor 22 becomes necessary. The other end of first force sensor 22 is attached to a lever 26, which is rigidly fixed to second bearing 50 by means of an optional lever connecting means 28, such as two screws in this example. Lever 26 conducts any pivotal movement about pivot axis Y radially outward to a position in proximity to the one end of first force sensor 22 being attached to drive support member 74. With increasing distance from pivot axis Y, displacements induced by the rotation between lever 26 and drive support member 74 become larger, thus reducing the error of first force sensor 22. However, since first force sensor 22 is provided in the space between drive support member 74 and second bearing 50, the overall extension is not increased.

Instead of being connected between second bearing 50 and drive support means 74, first force sensor 22 can also be connected between stationary frame 60 and first bearing 40, respectively drive support means 74. In this case, first force sensor 22 measures a pivot movement about pivot axis Y overlaid with an longitudinal movement along transverse axis X. However, since the longitudinal movement is orthogonal to the pivot movement, the two movements can be separated easily.

A second force sensor 24 is positioned between second bearing 50 and stationary frame 60 within sensor recess 36. Thus, second force sensor 24 must not extend axially over support plate 30. Thereby, the overall size and dimension of measuring unit 20 can be reduced. Since sensor recess 36 is provided in a radial direction with respect to the centre of the through hole 31 for receiving measuring shaft 12 therein, the measuring or detection axis of second force sensor 24 intersects the centre of measuring shaft 12 and corresponds to transverse axis X.

Although first force sensor 22 and second force sensor 24 are exemplified at the particular positions shown in the figures, different locations for the respective sensors are also contemplated by the person skilled in the art. Most importantly, the location of the first and second force sensor 22, 24, respectively, and the orientation of the respective detection axes must allow for a separation of the two axes of movement, namely the rotation about pivot axis Y and the translation along transverse axis X.

In this example, piezo-electric force sensors can be used as an example of first force sensor 22 and second force sensor 24. However, also different types of force sensors known to the skilled person are considered.

FIG. 4 shows a schematic perspective view of a wheel balancing machine 200 as an example for a tyre service machine. FIG. 4 shows wheel balancing machine 200 from a front side thereof having measuring assembly 10 mounted to the top of machine frame 202. Measuring assembly 10 and measuring shaft 12 are supported on machine frame 202 by means of measuring unit 20.

Wheel balancing machine 200 operates by rotating an unbalanced vehicle wheel about main shaft 5 and measuring the effect caused by any unbalances in order to attach counterweights at suitable positions on the inner circumferential surface of the vehicle wheel rim.

For this purpose, the exemplary wheel balancing machine 200 as shown in FIG. 4 provides four different exemplary measuring units 20, 80, 90 and 100 which will now be disclosed in further detail. All measuring units 20, 80, 90 and 100 can be realized as replaceable, self-contained units which can carry out measurements on their own, without relying on information from remaining parts, particularly electronics, of wheel balancing machine 200. To this end, each measuring unit 20, 80, 90 and 100 comprises a processing component 28, 88, 98 and 108, respectively, which is arranged for receiving and processing measurement data received by sensors contained in a sensor component of the respective measuring component 20, 80, 90 and 100. Preferably, the respective processing component 28, 88, 98 and 108 receives raw data and processes the raw data, such that wheel balancing machine 200 can become independent from the particular choice of sensors or measuring unit, as the processed data is commonly understandable, for instance, in a common data format. Thereby, it is also possible for each of the respective measuring units 20, 80, 90 and 100 to be installed readily calibrated, such that installation and maintenance effort for the respective measuring devices is minimized. In addition, each of the measuring units 20, 80, 90 and 100 can be replaced by different or alternative measuring units without changes or recalibration becoming necessary to the remaining wheel balancing machine 200.

Additionally, each of the processing components 28, 88, 98 and 108 is connected to or comprises a data communication component 29, 89, 99 and 109, respectively. In this example, each data communication component 29, 89, 99 and 109 is provided as a wireless data communication. By means of the respective data communication component 29, 89, 99 and 109, data processed by the respective processing component can be transferred among the various measuring units 20, 80, 90 and 100 and also between the respective measuring unit and a central processing unit 208 of the wheel balancing machine 200. To this end, wheel balancing machine 200 comprises a data communication component 209 in connection with central processing unit 208. Preferably, also data communication component 209 is a wireless data communication component that is arranged to communicate with other data communication components such as data communication components 29, 89, 99 and 109 by a predefined protocol.

By providing the data communication components 29, 89, 99 and 109 as wireless data communication components, installation and connection effort and work in connection with cables can be omitted, such that an easier and less error-prone assembly and maintenance, such as for instance by mal-connection of cables can be achieved. Moreover, by disposing of any physical cables, space occupied by cables is not needed anymore and the wheel balancing machine 200 can be reduced in overall size, thereby possibly improving the balancing results as understood in the art.

Further, by employing a predefined protocol, the data communication becomes independent from the particular measuring sensor used. More specifically, the addressee of the data communication component 28, 88, 98, and 108 can recognize the processed data without an analysis of the data in view of sensor particularities becoming necessary. Thus, it is possible to alter, replace and/or add a measuring sensor to the measuring unit 20, 80, 90, 100 without difficulties for the other data communication component, such as the central processing unit 208 of the exemplary wheel balancing machine 200, to understand the altered and/or additional data.

Measuring unit 20 has been described with reference to FIGS. 1, 2A-2E, and 3A-3B. Next, each of the further exemplary measuring units 80 and 90 and 100 will be described with reference to FIGS. 5 to 7 in further detail. Particularly, measuring unit 80 is a semi-automatic parameter entry (SAPE) unit 80 and will be described with reference to FIG. 6. Measuring unit 90 is a geometrical sensing unit 90, such as a pivoting laser scanner unit 90, and will be described with reference to FIG. 7.

FIG. 5 corresponds to FIG. 1, wherein rotation encoder unit 100 and measuring unit 20 are shown with corresponding processing components 28, 108 and data communication components 29, 109. Accordingly, measuring unit 20 and rotation encoder unit 100 can readily communicate with central processing unit 208 via data communication component 209 by means of a predetermined protocol.

SAPE unit 80 comprises a feeler component comprising an axial extension section 81 and a radial rotation section 82. The feeler component is formed in the form of a bent arm, with the radial rotation section 82 extending substantially perpendicular from the forward end of the axial extension section 81. In this context, with "forward" the vehicle wheel mounting side of the wheel balancing machine is referred to.

FIG. 6 shows SAPE unit 80 in the resting position, which is the position with the axial extension section 81 being retracted to the rear of the measuring assembly 20 and the radial rotation section 82 being substantially horizontal with respect to the wheel balancing machine 200, as can best be seen in FIG. 4. A rejecting force is applied onto axial extension section 81 by means of spring 83, which biases axial extension section 81 towards the resting position.

Further, a retention means for biasing radial rotation section 82 towards the radial resting position can be provided, such as a torsion spring (not shown).

The radial rotation about rotation axis R and the axial extension along extension axis E can thus be determined based on the retaining forces by means of a first sensor 84 and a second sensor 85, respectively. In this example, first sensor 84 and second sensor 85 are provided as potentiometers, wherein also different sensor means are contemplated.

The coupling between first sensor 84 and radial rotation section 82 is achieved by means of geared wheels 87. The coupling between second sensor 85 and axial extension section 81 is achieved by means of a rack 86 provided on a surface of axial extension section 81 which engages with a geared wheel 87 provided with second sensor 85.

Both first sensor 84 and second sensor 85 are connected with processing component 88 for receiving and processing data sensed by the respective sensors. Processing component 88 can transfer and receive processed data and/or further information from wheel balancing machine 200, more precisely from data communication component 209 thereof, by means of data communication component 89, which is a wireless data transmission unit in this example.

In this example, the feeler component can be manually positioned by the user in order to indicate, for example, positions of spokes of a rim of the vehicle wheel.

In a further example, first sensor 84 and second sensor 85 can further comprise drive means for driving axial extension section 81 and radial rotation section 82 towards a defined position, such as a position for applying balancing weight calculated by central processing unit 208 of wheel balancing machine 200.

In even a further example, the position of weight to be applied can be indicated by means of a geometrical sensing unit 90 (described below). The weight can thus be mounted onto the end of radial rotation section 82 and attached at the indicated position by manually or automatically moving the feeler unit towards the indicated position and applying a pressure at the indicated position of the rim via the feeler unit for the weight to attach at the specified position.

Finally, FIG. 7 is a schematic and perspective view of a geometrical sensing unit 90 that includes as its main components a first sensing component 91 which is an optical sensing component, a second sensing component (not shown) which includes a position sensitive element, and a drive means 94. Geometrical sensing unit 90 further comprises a housing 96 and a coverage 97 arranged at the upper end of sidewalls 96*b* of housing 96 substantially congruent to base portion 96*a* of housing 96. First sensing unit 91, which is preferably an optical sensing unit, includes an emitter 92 and a receiver 93. Emitter 92 which is preferably a laser, and receiver 93 which is preferably a CCD sensor, are fixedly coupled to housing 96, and arranged in fixed relation relative to each other defining an acute angle between their optical axis, preferably equal to or less than 45°. Emitter 92 can emit light beams whereas receiver 94 can receive the light beam reflected from the tyre and/or rim of a wheel.

Drive means 94 is preferably a micro stepper motor and also accommodated in housing 96 and fixedly coupled thereto. Drive means 94 can further include a gear (not shown) which is aligned to a pivot axis AP about which geometrical sensing unit 90 may be reversibly pivoted in a pivot direction DP. In this embodiment, pivot axis AP is oriented vertically. However, geometrical sensing unit 90 can be arranged in any other orientation, i.e. with a pivot axis AP being horizontally oriented or somewhere between a horizontal and vertical orientation.

Housing 96 and coverage 97 are made from any suitable material, preferably plastics or metal. In one embodiment, housing 96 may be made from metal for providing a strong base for the components of geometrical sensing unit 90, and coverage 97 is made from plastics for enabling a wireless data transmission.

When mounting geometrical sensing unit 90 to a machine, the design of geometrical sensing unit 90 allows that only emitter 92 has to be adjusted. Due to the defined relationship between emitter 92 and receiver 93 by housing 96, no further adjustment is necessary. However, it is also possible that emitter 92 and receiver 93 can be adjusted, e.g. while assembling sensor device 1.

Geometrical sensing unit 90 is mounted to the frame work of a service machine such as wheel balancing machine 200 to be reversibly pivoted in pivot direction DP about pivot axis AP in a plane parallel to base portion 96*a* of housing 96.

A second sensing component which is also accommodated in housing 96 of sensing unit 90, includes a position sensitive element for detecting the position of sensing unit 90 during the pivot movement. The second sensing component may include any suitable position sensitive elements (not shown), preferably at least one and more preferably two accelerometers.

For executing a service operation on a wheel to be serviced, first sensing component 91 is directed towards the wheel for scanning the surface of tyre and/or rim, e.g. for detecting the geometry of tyre or rim. In case of a wheel balancing machine 200, geometrical sensing unit 90 may be used for identifying the position of a balancer weight to be attached to the rim for levelling an unbalance of the wheel.

Sensing unit 90 includes a data processing component 98 for determining the distance and the angular position of the surface portion of the tyre or rim just scanned based on measuring data obtained from first sensing component 91 and/or the second sensing component. The respective data are transmitted to the central processing unit 208 of wheel balancing machine 200, e.g. for controlling the rotation of the wheel about shaft axis 12, for rotating the wheel to a predetermined position, in which a balancer weight has to be placed or in which a deformation has been detected. Based on the data of the accelerometer sensors, also the pivot position of sensing unit 90 may be controlled by the central processing unit 208 of wheel balancing machine 200.

Finally, geometrical sensing unit 90 comprises data communication component 99 for communicating the data with data communication component 209 of wheel balancing machine 200 and the data communication components 29, 89 and 109 of the further measuring units 20, 80 and 100. Also this data communication preferably takes places wirelessly by means of a predefined protocol with the advantages described above concerning the further measuring units 20, 80 and 100.

Also geometrical sensing unit 90 is designed as a compact unit which includes all components necessary for scanning a vehicle wheel and for processing the scanned data. Thus, geometrical sensing unit 90 may be used as a portable sensing device, which may temporarily or permanently be coupled to the frame work of a wheel service machine 200.

LIST OF PARTICULARS

10 Measuring assembly
12 Measuring shaft
14 Clamping means
20 Measuring unit
22 First force sensor
24 Second force sensor
26 Lever
27 Lever connecting means
28 Processing component
29 Data communication component
30 Support plate
31 Through hole
32 Torsion Springs
33 Free space
34 Plate Springs
35 Free space
36 Sensor recess
40 First bearing
42 Ring-shaped member
50 Second bearing
60 Stationary frame
70 Drive means
72 Transmission belt
74 Support member
76 Electronics
80 Semi-automatic parameter entry (SAPE) unit
81 Axial extension section
82 Radial rotation section
83 Spring
84 First sensor
85 Second sensor
86 Rack
87 Geared wheel
88 Processing component
89 Data communication component
90 Geometrical sensing unit
91 First sensing component
92 Emitter
93 Receiver
94 Drive means
96 Housing
96*a* Base portion
96*b* Sidewall
97 Coverage 98 Processing component
99 Data communication component
100 Rotation encoder unit
108 Processing component
109 Data communication component
200 Wheel balancing machine
208 Central processing component
209 Data communication component
E SAPE extension direction
R SAPE rotation direction
X Transverse axis
Y Pivot axis
Z Shaft axis
AP Geometrical sensing unit pivot axis
DP Geometrical sensing unit pivot direction

The invention claimed is:

1. A measuring unit for measuring forces generated by an unbalance of a rotor mounted on a measuring shaft, the measuring unit comprising:
   a stationary frame,
   a first bearing for receiving the measuring shaft rotatably about its shaft axis (Z),
   a second bearing pivotally supporting the first bearing about a pivot axis (Y) which intersects the shaft axis (Z) by at least one first spring and being supported on the stationary frame,
   a first force sensor for measuring forces generated by an unbalance of the rotating rotor and acting on the measuring shaft about the pivot axis (Y), and
   a second force sensor for measuring forces generated by the unbalance of the rotating rotor and acting on the measuring shaft and on the second bearing in a direction intersecting the shaft axis (Z),
   characterized in that
   at least the second bearing and the stationary frame are integrally formed of a single element as a support plate, and
   the support plate further comprises a through hole and a ring-shaped member arranged in the through hole, for supporting the first bearing, wherein the ring-shaped member is coupled to the second bearing by at least the one first spring.

2. The measuring unit according to claim 1, wherein a detection axis of the second force sensor is arranged substantially perpendicular to both the pivot axis (Y) and the shaft axis (Z).

3. The measuring unit according to claim 1, wherein a detection axis of the first force sensor is arranged substantially parallel to the shaft axis (Z).

4. The measuring unit according to claim 1, wherein the support plate comprises the at least one first spring as an integral part thereof.

5. The measuring unit according to claim 1, comprising at least one second spring for supporting the second bearing within the stationary frame.

6. The measuring unit according to claim 5, wherein the at least one second spring is configured such that the second bearing is translational moveable with respect to the stationary frame in an axis (X) perpendicular to the shaft axis (Z) and/or the pivot axis (Y).

7. The measuring unit according to claim 5, wherein the support plate comprises the at least one second spring as an integral part thereof.

8. The measuring unit according to claim 1, wherein the support plate comprises a sensor reception recess for receiving the second force sensor perpendicular to the shaft axis (Z) and the pivot axis (Y) between the second bearing and the stationary frame.

9. The measuring unit according to claim 1, comprising a processing component for processing the data received by the first force sensor and/or the second force sensor, and
a data communication component for performing data communication with another data communication component.

10. The measuring unit according to claim 9, wherein the data communication component is arranged for wirelessly communicating with another data communication component according to a predefined protocol.

11. A wheel balancing machine comprising a measuring unit according to claim 9, and a central processing unit arranged for communicating with the data communication component of the measuring unit or the measuring assembly in accordance with a predefined protocol.

12. A measuring assembly comprising a measuring unit according to claim 1 and a drive support member in rigid connection with the first bearing for supporting a drive means for rotating the rotor about the shaft axis (Z), wherein the first force sensor is with one end thereof mounted to the drive support member.

13. The measuring assembly according to claim 12, comprising a lever extending from the second bearing substantially parallel to the drive support member, wherein the second end of the first force sensor is mounted to the lever.

14. A wheel balancing machine comprising a machine frame and a measuring unit according to claim 1.

* * * * *